April 2, 1963  T. F. McHENRY ETAL  3,084,253
CONTINUOUSLY SELF-CALIBRATING DIFFERENTIAL
DETECTION SYSTEM Filed Sept. 6, 1960  5 Sheets-Sheet 1

INVENTORS
THOMAS F. McHENRY
ROBERT W. ASTHEIMER
BY
ATTORNEY

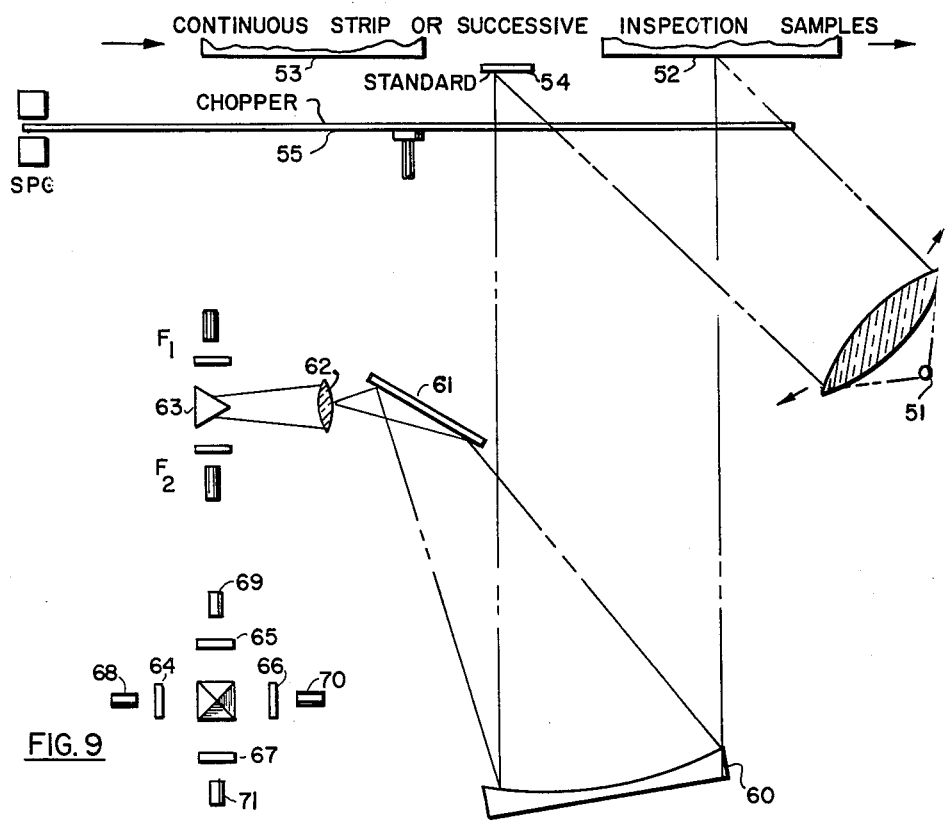
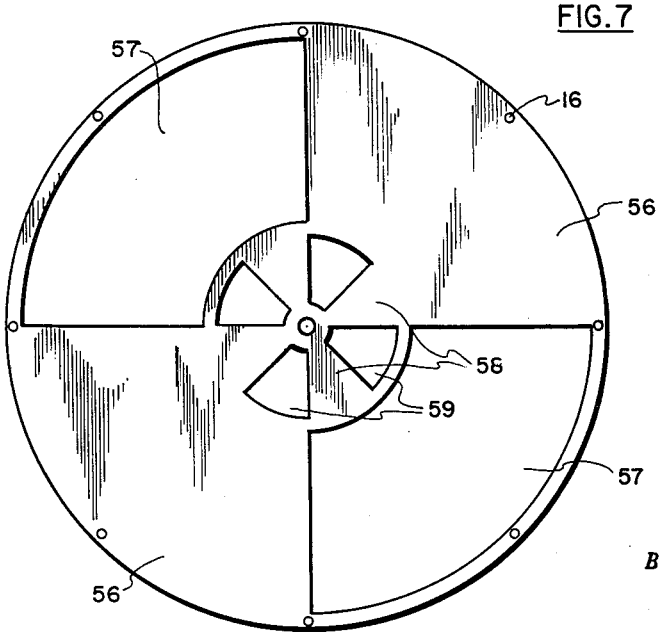
FIG. 7
FIG. 9
FIG. 8

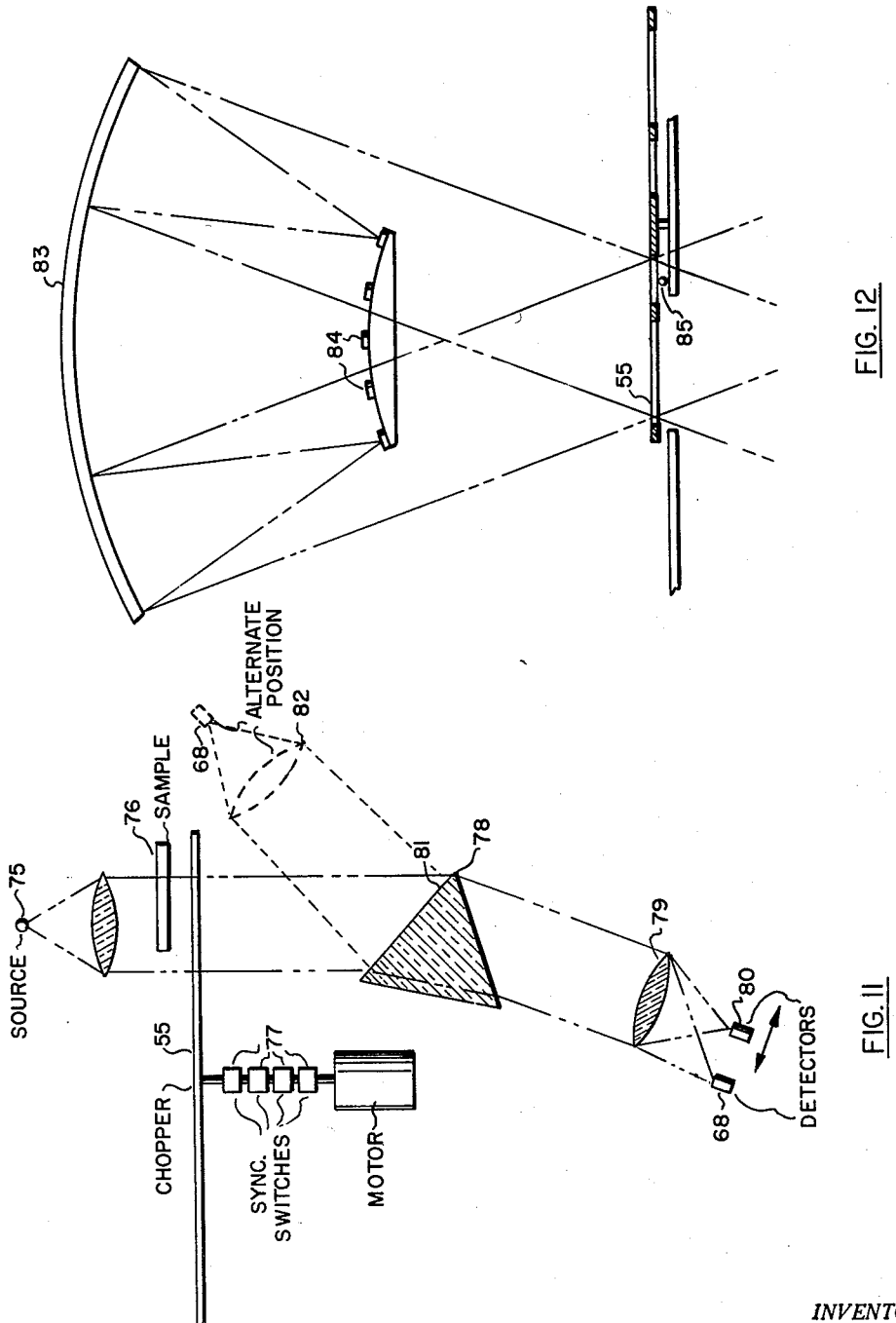

3,084,253
CONTINUOUSLY SELF-CALIBRATING DIFFERENTIAL DETECTION SYSTEM

Thomas F. McHenry, South Norwalk, and Robert W. Astheimer, Westport, Conn., assignors to Barnes Engineering Company, Stamford, Conn., a corporation of Delaware
Filed Sept. 6, 1960, Ser. No. 54,173
10 Claims. (Cl. 250—83.3)

This invention relates to apparatus and method for measuring accurately, by means of radiations, the changes in one or more properties of objects. More particularly, the invention relates to apparatus in which all or most changes in the apparatus or its environment are cancelled out and do not affect accuracy or reliability of the measurement.

In the past, problems have arisen to detect changes of properties of objects by means of radiant energy of wavelength short enough to obey optical laws accurately. This radiation will be referred to as optical radiation. These changes may be of many types. For example, there may be a change in the composition of a fluid such as air or flowing streams of gases or liquids in chemical processes. In such cases, it is important to be able to measure continuously the concentration of one or more elements of the fluid or to warn when a particular component of the fluid appears or reaches a predetermined minimum concentration.

Another type of property in an object which can be detected by optical radiation is reflectance. For example, it is important to maintain a check on the reflectance of certain painted objects. Thus, for example, white or other colored refrigerator enamels may change and it is important to measure the amount of spectral change or color or to check against a standard and to warn when the samples differ from the standard by more than a predetermined amount at one or more wavelengths.

The above two illustrations of types of problems which can be solved by the present invention deals essentially with a difference in spectral properties which we may loosely call a color difference using this term also to include difference in spectral properties in the infrared or the ultraviolet. In the cases of components of a fluid, this spectral change will usually involve a change in absorption although in the infrared changes in self-emission may also be measured. The instruments of the present invention are, however, not limited to measuring changes which are indicated by a change in color or spectral properties. Other characteristics may also be measured. The above are only a few typical problems involving very precise measurement, often of minute changes in energy. They are merely illustrative of the field of which the instruments of the present invention find the usefulness. Essentially the present invention involves an instrument, or method of operating it, and, therefore, the above illustrations merely point out typical ways in which the instrument of the present invention may be used. For more detailed description, two types of measurements will be described. First, detection of small changes in components of fluids and the second, reflectance changes.

Essentially, in the direction, measurement, and, in some cases, control of changes in objects which are perceptible by optical radiations a serious limit is placed on accuracy and reliability by environmental changes in the instrument itself and its components. For example, if the instrument is utilizing infrared radiations, the temperature of the instrument or of some of its components may change and this may be interpreted falsely as a change in the property or properties or the object which the instrument is investigating. The sensitivity of the components, such as radiation detectors, may also change. Most sensitive instruments employ electronic amplifying and processing circuits and there are a number of factors which may change and influence circuit responses. For example, power supply voltage may change, components, such as tubes, or the like, may change their characteristics and other factors may influence the electronic portion of the instrument.

Many instruments have been designed in which the above factors are compensated for by initial calibrations. The difficulty involved is that when instruments of extreme sensitivity are used, calibration may not remain constant and any change is falsely interpreted by the instrument as a change in the property or properties of the object being investigated. It is the greatest single advantage of the present invention that most, or in some modifications practically all, of the environmental factors involving the instrument and its components are continuously, automatically, and rapidly balanced out. This removes completely the serious limitation on many highly sensitive instruments due to environmental change which might be thought of as instrumental drift. Therefore repeated calibrating is thus obviated.

The instruments of the present invention are multichannel instruments in which the different channels are continuously receiving radiations from the object or objects to be investigated. These radiations are chopped by chopping means which alternately compare the input to a reference within the instrument's environment and is often a part of the instrument itself. This comparison is effected at one frequency and, at the same time, channels investigating the objects are chopped at a different frequency or, in certain more complex instruments, more than one different frequency. At this point an essential feature of the present invention should be brought out, namely, that the different frequencies must be even multiples. For example, if one frequency, $f$, represents the rate of interruption of the radiation from the object to be investigated then, if there are only two frequencies to be investigated, the second frequency may be $2f$. If more than two frequencies are involved, the same thing holds. For example, three frequencies might be related as $1f$, $2f$, and $4f$, or $1f$, $2f$, and $8f$. The reason for the essential requirement of even multiple frequencies is that the higher frequencies when averaged out over one period of the lower frequency will not affect the net electrical signals at the lower frequency.

For simplicity, the situation of two channels and two frequencies will first be considered. One channel will have one radiation response, for example, due to a filter, the other will have a different response. For example, it may have a different filter which does not transmit the same wavelength band as the first. A chopper for radiation of both channels is provided which alternately passes radiation from the channels and from a reference source, let us assume at a frequency $1f$. At the same time a chopper, preferably the same chopper, compares the reference within the instrument environment with another reference which is not the same as that used in the $1f$ chopping. This second comparison is at a frequency of $2f$. The radiations at both frequencies strike detectors in the different channels or, in certain modifications, a single detector. Electrical output signals from each detector are produced which contain both frequency components. The electronic processing circuits then separate the signals and produce a different signal at the $2f$ frequency. This signal, usually after amplification, then operates means to vary the responses of the detectors and/or their circuits until the difference voltage at the $2f$ frequency becomes zero. Then the instrument has completely cancelled out the effect of all or practically all of its environmental changes and this autocalibration is continuously effected. Any signal coming out of the channels at the 1*f* frequency is now due solely to differences in properties of the object examined and is unaffected by any further environmental changes in the instrument itself. In other words, any signals at 1*f* frequency are true signals and report the properties of the object or objects being investigated. The instrument may be considered as correcting itself, or recalibrating itself, at the 2*f* frequency and is thus continuously balanced even against large, unsymmetrical environmental changes or instrument drifts.

The balancing out at the 2*f* frequency may be effected in a number of ways. The difference signal may operate servo mechanisms which change the radiation input in different channels, where each channel has its own detector. The difference signal may also change the electrical response of the circuits, for example, by changing amplification or by injecting an offset signal. Any means which will change the final response of the different channels at the 2*f* frequency can be used. Because electrooptic controls often require mechanical linkage and have relatively longer time constants, the all electronic balancing at the 2*f* frequency is usually preferable. This will be the form described in the detailed instrument description to follow, it being understood that in its broadest aspect the invention is not limited thereto.

Theoretically, it would be possible to effect calibration at the 1*f* frequency and use the 2*f* frequency for the channel signals. This is operative and not excluded from the present invention but the use of a higher multiple as the calibration frequency presents advantages, such as a faster sampling. Thus it is preferred and in the specific description the higher multiple frequency will be used as the calibrating frequency.

The present invention will be described in detail in conjunction with the drawings in which:

FIG. 7 is a diagram of a multichannel reflectance measuring instrument;

FIG. 8 is a plan view of the reticle of FIG. 7;

FIG. 9 is a plan view of detectors and filters of FIG. 7;

FIG. 11 is a diagram of a continuous spectral analyzer;

FIG. 12 is a diagrammatic representation of a "push broom" radiometric system.

Figure 1:
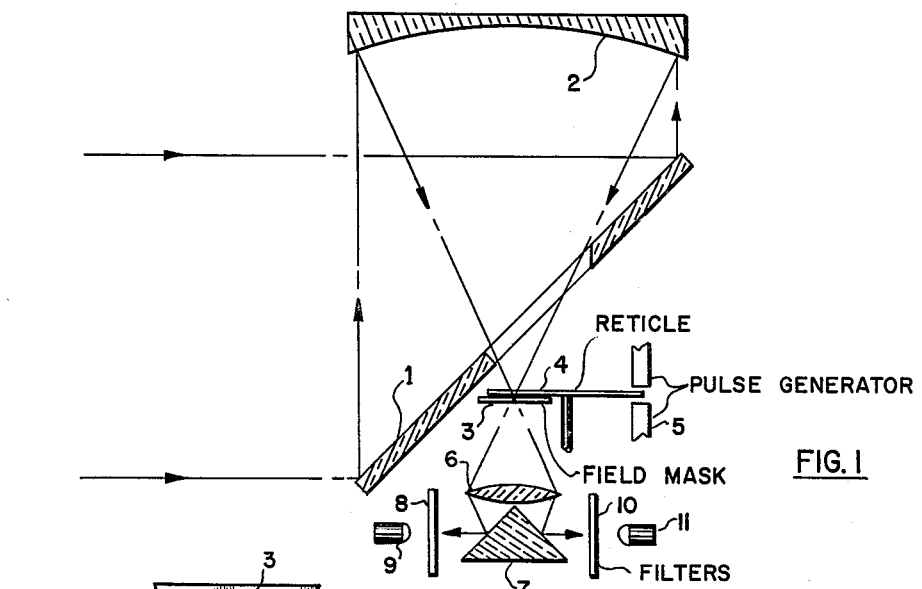
FIG. 1 is a semidiagrammatic representation of the optics of a two channel, two detector instrument.
Figure 2:
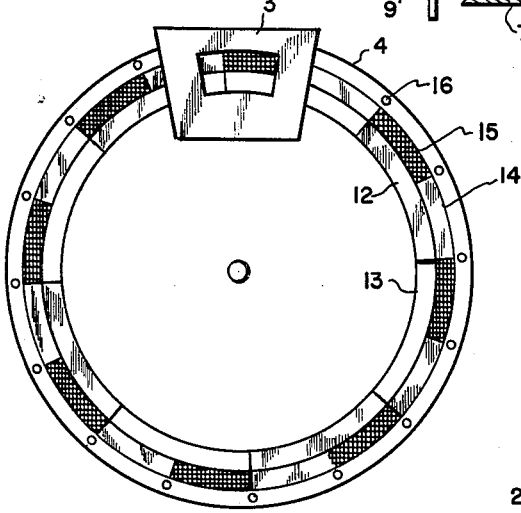
FIG. 2 is an enlarged plan view of the chopping reticle of FIG. 1.
Figure 3:
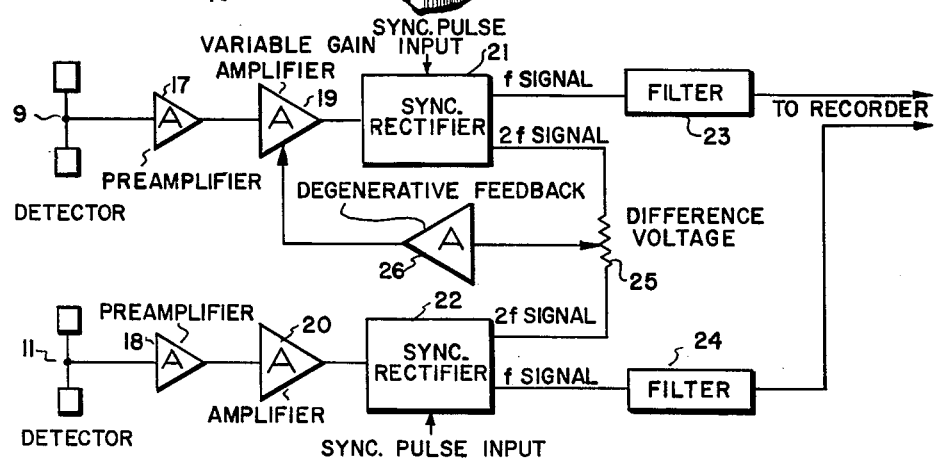
FIG. 3 is a block diagram of the electronic circuits of the instrument of FIGS. 1 and 2.

In the description of the instrument shown in FIGS. 1 to 3, it will be assumed that the instrument is being used to detect small amounts of hydrocarbons in air or exhaust gases, which hydrocarbons can contribute to the forming of smog. These hydrocarbons have an absorption band at about 3.4μ in the infrared corresponding to the C—H stretching vibration. This illustration will, therefore, presuppose that the instrument is provided with filters suitable for the band in question and, of course, detectors responsive to radiation of these wavelengths.

FIG. 1 illustrates an instrument using Pfund pierced mirror collecting optics. The incoming radiation strikes an inclined pierced mirror 1 and is reflected onto a spherical converging mirror 2 which converges the beam through the opening of the pierced mirror, imaging it on the plane of a field mask 3 in front of which is a rotating chopper 4 in the form of a reticle conventionally driven by a motor (not shown). The reticle also serves to actuate a synchronous pulse generator 5 which is of conventional design and so is shown only diagrammatically. Field mask and reticle will be described in detail below in connection with FIG. 2.

After passing through the reticle and field mask, the beam of radiation passes through a transfer lens 6 encountering a beam splitting prismatic mirror 7. Here it is split into two beams, one passing through a filter 8, centered in a narrow band at 3.4μ, and onto a detector 9. The other beam passes through a filter 10. This filter does not transmit in the regions where the hydrocarbons absorb. The two detectors are indicated as immersed detectors but as they are of well known design they are shown purely diagrammatically.

FIG. 2 shows field mask 3 and reticle 4 in detail. This reticle is provided with three concentric bands, the first of which alternates reflecting sections 12 with openings 13. The second band alternates reflecting sections 14 with blackened sections 15. The sections 14 and 15 are exactly half the length of sections 12 and 13 and therefore when the reticle is rotating, this band produces radiation variations at double the frequency of the inner band. On the outermost band there are a series of pulse markers 16 which cooperate with the synchronous pulse generator 5. The pulse frequency is the same as that of the band of sections 14 and 15 and is at 2*f* frequency. FIG. 1 is diagrammatic and does not show the details of any particular synchronous generator structure as these are conventional. They may be of any suitable type such as magnetic generators, in which case the markers 16 are of magnetic materials, or interrupted radiation beam generators in which case the markers art openings.

In operation the reticle alternates radiation coming into the collecting optics and passing through the openings 13 with an image of the detector and its environment, such as the filter, which is reflected by the reflecting sections 12. These reflecting sections constitute a reference source which may be slightly above the average temperature of the instrument as the detectors are warmed to some extent by the current flowing through them. The interruption may, for example, be at a frequency of 50 c.p.s. which is the 1*f* frequency.

The next band on the reticle alternates the mirror sections 14 with sections 15 which are blackened. It produces an interruption at 2*f* frequency, or 100 c.p.s. It should be noted that this second band does not involve radiation from anything outside of the instrument and therefore, after initial calibration, does not produce any difference signals on the two detectors unless there are changes in the components within the instrument. These include, for example, changing detector sensitivity, aging of filters, dust or other obscuration in the light paths, and the like. The markers 16 produce signal pulses, also at 2*f* frequency, and the use of these pulses will be described below in conjunction with the description of the electronic processing of the signals from the detectors.

FIG. 3 shows a block diagram of the electronic circuits for detectors 9 and 11 which are represented as thermistor bolometers with the customary active and compensating flakes. Signals from each detector, both at the 1*f* and 2*f* frequency, are amplified in the preamplifiers 17 and 18 and then in the amplifiers 19 and 20. While the preamplifiers are of the same design, the main amplifiers are not, amplifier 19 being of the variable gain type. The amplified signals from each detector are synchronously rectified and separated in the synchronous rectifiers 21 and 22. Low pass filters 23 and 24 pass the 1*f* frequency signal on to a recorder or to any other instrument in which the signal is to be used. The 2*f* signals are introduced in opposition into a potentiometer 25 and the net difference amplified in the amplifier 26 and fed back degeneratively into the variable gain amplifier 19, adjusting its gain until the 2*f* signals from both channels are in balance. A moving arm on the potentiometer 25 is used for initial calibration; thereafter, any changes in the internal components of the instrument are automatically balanced and cancelled out.

The effectiveness of this continuous cancellation can be illustrated by considering one type of change of conditions in the instrument. Let us assume that the instrument is perfectly balanced and is operating at one temperature and the temperature then rises. The change with temperature of detector responsivity and filters 8 and 10 cannot be made absolutely identical. This will result in a greater electrical response in one channel in the instrument at both $1f$ and $2f$ frequencies. All components are chosen so that the change of response is the same at both frequencies. There will then be an unbalance in the $2f$ signals from the two rectifiers and this, when amplified by the amplifier 26, will change the gain of the amplifier 19 until the unsymmetrical effects of the temperature changes are cancelled out. The resulting autocalibration thereby makes the response at $1f$ in both channels the same as far as instrument drift is concerned. In practice, of course, the changes are small and so the amount by which the gain of the amplifier 19 has to be changed will also be quite small.

The output of the instrument described in FIGS. 1 to 3 is in the form of separate signals at $1f$ frequency from each channel. These separate signals may be utilized in any way desired. If measurement is of interest they may be utilized in an instrument which will respond either to their ratio or their difference. On the other hand, when detection or alarm functions are desired, the difference of the two signals is more easily obtained and is preferable. Recorders, or other instruments having circuits responding to ratios or to differences, are completely conventional and are therefore not shown. The invention is quite versatile as the output signals are of such a nature that they can be used in any type of recorder or other readout instrument.

It will be noted that the instrument as described for the detection and/or measurement of hydrocarbon concentration may be used in the form of a passive instrument. For example if the detection is to be for hydrocarbons in the stack gases of a chimney at some distance, these gases will be hot and will, therefore, emit in their absorption band of $3.4\mu$. If it is desired to measure the concentration in automobile exhaust gases or under certain circumstances in the atmosphere in general, it is possible to use the instrument either as a passive or active instrument. For example the instrument can observe the hot exhaust of an automobile against a suitable background such as a concrete floor or driveway. When the exhaust gases leaving the exhaust have reached a steady temperature their emission may constitute the significant portion of the total energy in the bands of interest. If the hydrocarbon concentration in the atmosphere is to be measured passively, this will be affected by the nature of the background against which the atmosphere is viewed, and required that the atmosphere be at a somewhat different temperature than the background.

The above points up one of the characteristics of the instrument as a passive one, namely that some temperature difference of the gases with respect to background is necessary. If there is to be reasonable accuracy some rough knowledge of the temperature of the gases is required. As described the passive instrument has the enormous advantage that it can measure or detect changes at a distance. This is, however, at the expense of precision of measurement which is true of passive instruments.

The instrument may also be used as an active instrument by providing a definite source of radiation. As far as source and gas absorption is concerned, the present instrument does not differ from other active gas analyzers but it does lend its great advantage of continuous auto-calibration so that no changes in the environment of the instrument or its components will adversely affect its operation.

Figure 4:
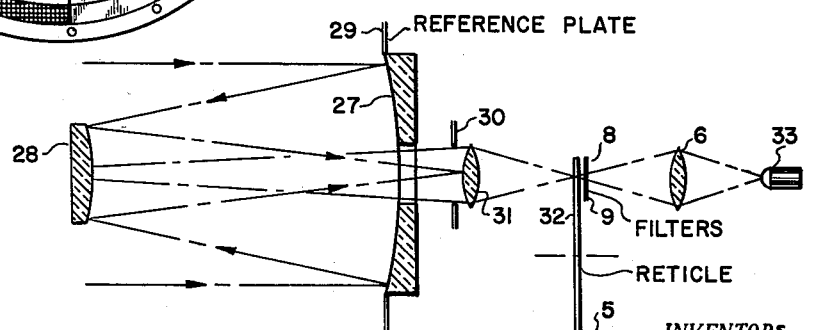
FIG. 4 is an optical diagram of a dual channel single detector instrument.
Figure 5:
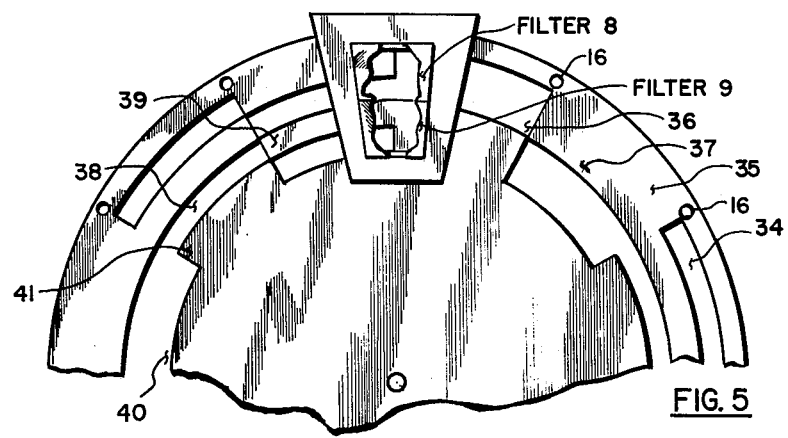
FIG. 5 is an enlarged plan view of a part of the reticle of FIG. 4.
Figure 6:
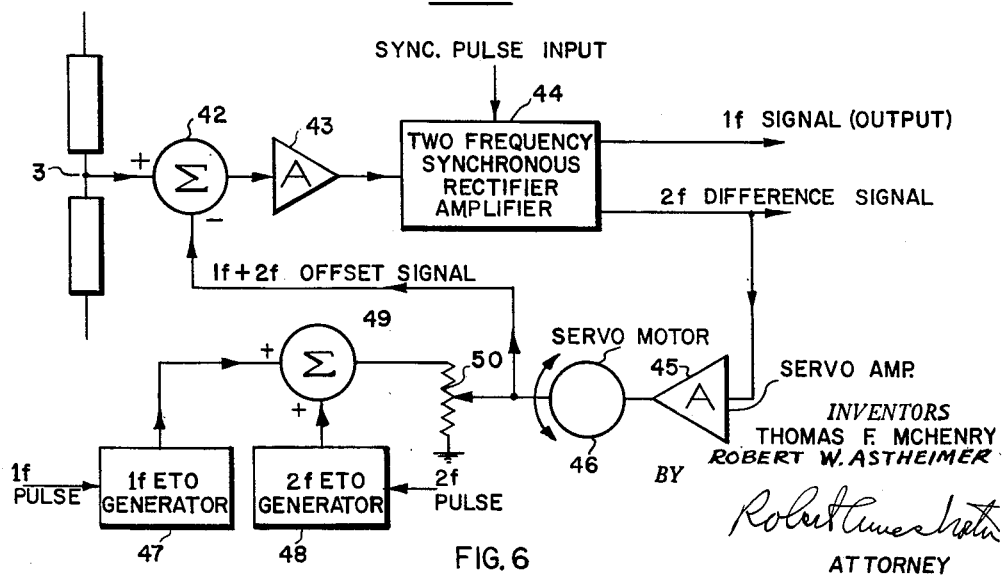
FIG. 6 is a block diagram of the electronic circuits of the instrument of FIGS. 4 and 5.

FIGS. 4 to 6 illustrate a modification in which a single detector is used. In FIG. 4 a somewhat modified form of collecting optics is employed, namely a Cassegrain mirror 27 with secondary mirror 28, and blackened reference plate 29 which surrounds the primary mirror. A field mask 30 defines the field view and the incoming radiation is imaged by field lens 31 onto the plane of a reticle chopper 32 which also operates a synchronous pulse generator 5 in the same manner as the reticle in FIGS. 1 and 2. The filters 8 and 9 are very close to the image plane. A transfer lens 6 then images the beam onto a detector 33. The function of the transfer lens is the same as the corresponding element in FIG. 1 but as there is only one detector, there is no beam splitter.

The reticle and filter holder is shown in FIG. 5 and here the filters 8 and 9, which are the same as the corresponding filters in FIG. 1, divide the aperture into two parts radially. As in FIGS. 1 and 2 the filter 8 passes the $3.4\mu$ band and the filter 9 a band in which the hydrocarbons do not absorb.

The reticle has five concentric bands instead of three as in the case of FIG. 2. The outer band contains synchronous pulse markers 16 which function exactly the same as in FIG. 2. They are also disposed to correspond to the $2f$ frequency. Moving in radially from the outer band, there are two bands which pass in front of filter 8. These bands, as in fact all of the remaining four bands of the reticle, are alternating mirror and clear segments. The outer of the two bands has clear portions 34 and mirrors 35 and the segments are arranged to interrupt the beam at $2f$ frequency. The next band has clear portions 36 and mirrors 37 but each is twice as long and corresponds to the $1f$ frequency. The two innermost bands on the reticle pass in front of the filter 9, the first having long clear segments 38 and mirrors 39 corresponding to the $1f$ frequency and the innermost band shorter clear segments 40 and mirrored segments 41 corresponding to the $2f$ frequency.

The optics are aligned so that the reference plate 29 around the primary Cassegrain mirror is imaged by the field lens 31 onto the outer band of filter 8 and the inner band of filter 9. In other words, as the reticle rotates the detector puts out a $2f$ signal corresponding alternately to the reference plate 29 seen through 34 and 40 and the mirror segments 35 and 41. The object which is to be investigated is imaged by the optics on the lower part of filter 8 and upper part of filter 9 and passes through the corresponding bands of the reticle. In other words, the radiation from the object to be investigated is interrupted at the $1f$ frequency by clear segments 36 and mirror segments 37 in the band passed by filter 8 and by clear segments 38 and mirror segments 39 in the band passed by filter 9. Again, the detector, and its vicinity, which is reflected by the mirror segments, is used as a comparison reference but this time only with the object to be investigated instead of the external black reference plate 29 as in the case of the $2f$ frequency comparisons described above.

FIG. 6 shows a block diagram of electronic circuits. As in FIG. 3 the detector 3 is shown schematically as a thermistor with an active and passive flake. The detected signals pass into an amplifier 43 and then a synchronous rectifier amplifier 44. From this amplifier two signals emerge, one at the $1f$ frequency and the other at the $2f$ frequency. The $2f$ frequency signal is amplified in a servo amplifier 45 which actuates a servo motor 46 driving a potentiometer 50. Two pulse actuated generators 47 and 48 operating at $1f$ and $2f$ frequencies respectively, produce square waves of adjustable amplitude and in phase with the corresponding frequencies entering an adding circuit 49.

For calibrating purposes the instrument is first pointed at a uniform target, preferably as near as possible to the temperature and emission characteristics of the reference plate 29. This target will have no differential emission at $3.4\mu$. The servo motor 46 is temporarily inactivated, for example by turning off the amplifier 45. Potentiometer 50 is set for some suitable position, for example about midpoint. Signal observing means are then connected to the 1$f$ and 2$f$ signal outputs. Then the generator 48 is adjusted until there are no 2$f$ signals. This adjustment is locked and the generator 47 adjusted until there is no 1$f$ signal and it too is then locked. Then the servo motor 46 is once more activated and there should still be no signal observable at either the 1$f$ or 2$f$ frequencies. The instrument is now calibrated and ready for use.

It will be noted that there are only half as many detectors and amplifiers, as a result, the instrument is somewhat simpler. It is, however, subject to certain possible errors in use. This type of instrument is vulnerable to differential changes in the generators 47 and 48. It will be recalled that the initial calibration was carried out by adjustments on these two generators. If these adjustments do not remain constant or change exactly in unison, a spurious 1$f$ signal can result. It is possible to make stable square wave generators but no electronic equipment is completely immune to changes in the characteristics of its components. When the instrument is used under severe environmental conditions the modification of FIGS. 4 to 6 does not have as great a long term reliability and accuracy as does the two detector instrument of FIGS. 1 to 3. However, for some uses where the absolute maximum of long term reliability and precision is not needed, the instrument of FIGS. 4 to 6 is suitable and, since it is somewhat simpler, may be economically desirable. It is therefore included within the scope of the invention.

FIG. 3 shows an all electric control of the variable gain amplifier in one channel. FIG. 6 shows auto-calibrator using a servo motor. These are equivalents. A servo motor can be used to actuate the variable gain amplifier 19 of FIG. 3, and a variable gain amplifier for the output of the potentiometer 50 in FIG. 6 may replace the servo motor.

One more difference between the instrument of FIGS. 1 to 3 and FIGS. 4 to 6 merits brief discussion. The two detector instrument of FIGS. 1 to 3 produces 1$f$ signals from the separate channels. These signals may, therefore, be used in recorders or other instruments to produce responses which are either an arithmetical difference or a ratio. The instrument of FIGS. 4 to 6 does not have this same versatility. Only a single type of signal, namely an arithmetical difference signal, is produced. For warning or detecting instruments the difference signal is entirely satisfactory but for precise measurement a ratio signal may be desirable. For detection and warning instruments, therefore, the distinctions in the nature of the signal produced by the two instruments are of no significance but where measurement is required the greater flexibility presented by the instrument of FIGS. 1 to 3 is an additional advantage.

FIG. 7 illustrates a modification of an instrument of the present invention which is an active form and uses the instrument for precise color comparison. The instrument includes a source of light 51 which is movable about an arc, the center curvature of which is located in the plane of the samples to be investigated. Since FIG. 7 is semidagrammatic in nature the movement of the source is indicated only by the curved arrows.

At the center of curvature of the arc on which the source can be moved is the sample which is shown at 52. The modification will be described in connection with the problem of matching white or colored enamels for refrigerator and similar appliances. The sample is illustrated as a line along which successive refrigerators move. One refrigerator is shown in position 52 and the following 53.

The instrument is provided with a fixed reference panel 54 which is painted with a standard enamel, against which the samples are to be compared. This standard may be removable so that different painted panels may be used for different colored enamels.

Light reflected from the samples and the standard is chopped by a reticle 55 which is conventionally rotated by a motor (not shown). The design of the reticle is shown in FIG. 8. It will be seen that it has an outer portion having two solid sectors 56 and two open sectors 57. Nearer the hub of the reticle are located four solid sectors 58 and four alternate open sectors 59. It will be apparent that light rays reflected from the samples pass through the outer portion of the reticle and so are chopped at a lower frequency which, in the notation already used, is the 1$f$ frequency. The light reflected from the standard 54 passes through the central portion of the reticle and so is chopped at a 2$f$ frequency. All of the rays strike a slightly tilted converging mirror 60 and the resulting beam then is reflected by a plane mirror 61 through a field lens 62 onto a pyramidal mirror 63 which is provided with four faces as shown in FIG. 9. The light reflected from each face passes through filters 64, 65, 66 and 67 and it strikes visible light detectors 68, 69, 70 and 71.

One of these beams, namely the one striking the detector 68, will be used as a reference beam as will be brought out more fully below in the description of the electronic circuits. As this detector is not supposed to receive only colored light, the filter 64 may either be omitted altogether or, if the intensity of the beam striking detector 68 would otherwise be excessive, a neutral gray filter may be provided. In an actual instrument, the filters will all be replaceable using conventional filter holders. The other three filters 65, 66 and 67 are selected to pass more or less narrow bands of visible light chosen to bring out most sharply departures from the standard color of the panel 54. In the case of a white enamel, one of these filters, for example, filter 65 will normally be blue, the other two filters, for example might be green and yellow but their choice is determined by the nature of the materials going into the particular paint which is to be matched and so they will change with the particular comparison to be made.

Figure 10:
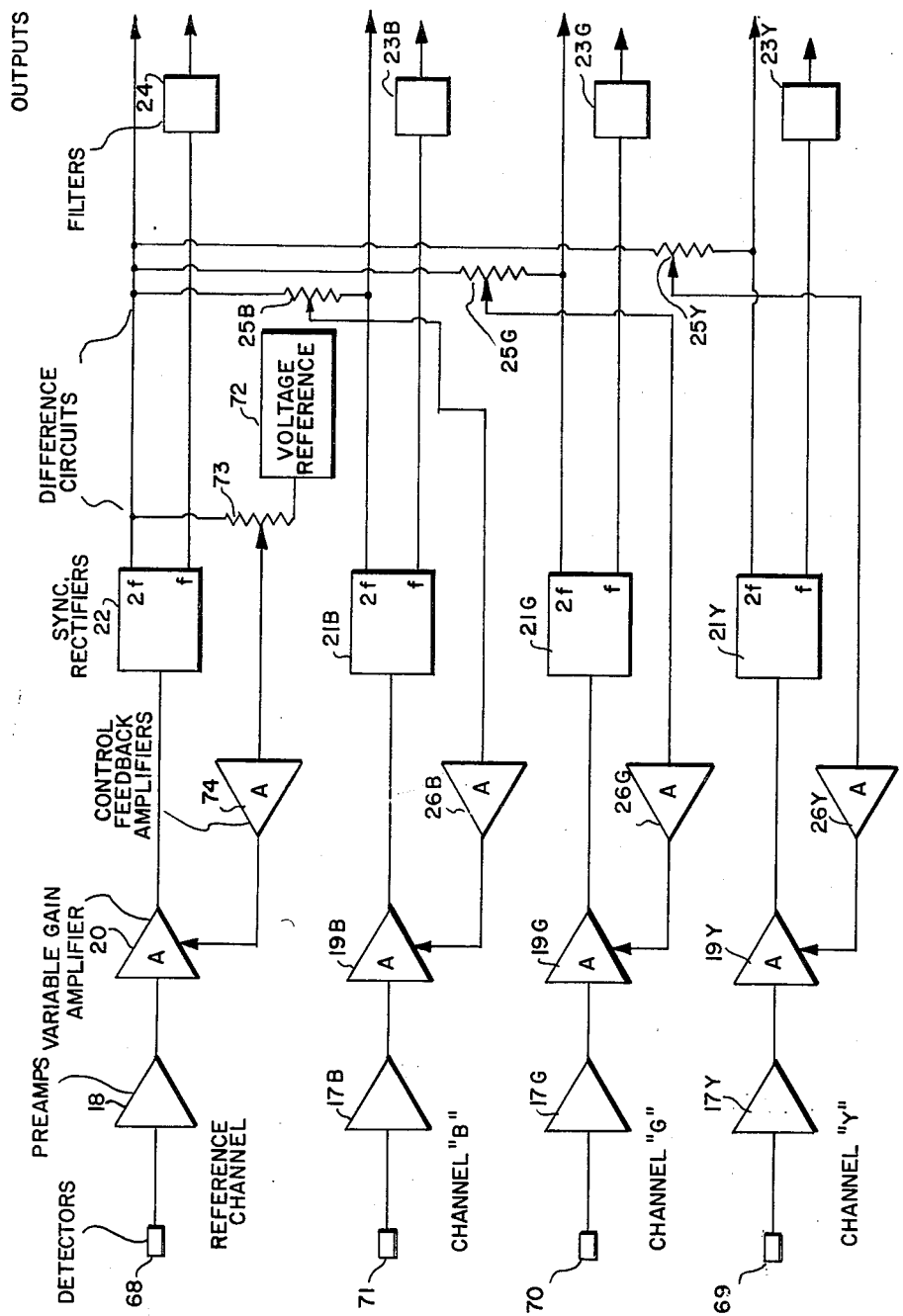
FIG. 10 is a block diagram of the electronic circuits of the instrument of FIGS. 7 to 9.

Turning now to the electronic circuits, which are shown in FIG. 10, it will be noted that these are very similar to the circuits shown in FIG. 3 and the elements which correspond to these figures will be given the same reference numerals. The detectors are of a different type, since FIG. 3 was illustrating an infrared instrument, and bear the same reference numerals as in FIG. 9. It will be seen that with one exception, which will be discussed below, the circuits for detector 68 are the same as for the detector 11 in FIG. 3 and this is used as the reference circuit. As the other three circuits have in general the same elements their reference numerals are given suffixes B, G and Y corresponding to the colors of the filters 65, 66 and 67. It will be seen that there is a difference voltage potentiometer 25 in the 2$f$ signal circuits between the reference synchronous rectifier 22 and each of the other three rectifiers 21. These difference voltage potentiometers bear suffixes as described above as do the filters 23.

There is shown a source of constant voltage 72 connected to the 2$f$ output of the synchronous rectifier 22 through a difference voltage potentiometer 73. The adjustable arm of this potentiometer leads to a degenerative feed back amplifier 74 which controls the gain of the amplifier 20 which then becomes the same type as the amplifier 19. To avoid multiplication of legends on drawings they are placed at the top of columns in which elements appear.

In operation the light source 51 is turned on and a sample and standard viewed. If the filters 65, 66 and 67 and the sensitivities of the detectors 69, 70 and 71 are not equal in response at the 2$f$ frequency, which will initially be the case when the instrument is first used, there will be produced difference signals at the 2$f$ frequency between the circuits of each of the detectors and that of the reference detector. As described in connection with FIG. 3 these signals when amplified in the degenerative feed back amplifiers 26 will adjust the gain of the corresponding amplifiers 19 until the output at the $2f$ frequency of all four channels is the same. If the sample 52, for example a refrigerator passing along an inspection line, is an exact match for the panel 54 there will also be the same output at the $1f$ frequency in all four channels. If a recorder is used which gives the ratio or difference between each of the three channels and the reference channel respectively, there will be three traces showing lines corresponding to the zero setting of the recorder for each trace. Let us assume that the next refrigerator to pass is not a pure white but is slightly yellowish, this will show less reflection in the blue and more reflection in the yellow and possibly also in the green. As a result, the output signals of the three color channels at $1f$ frequency will be different from that of the reference and the recorder or other indicating instrument will show this fact and will also measure the amount of departure from a perfect match.

All environmental changes, with one exception which will be noted later, that may influence the instrument are cancelled out. For example suppose that the blue filter 65 changes its transmission by deposition of dust or anything else and let us further suppose that the detector 70 changes sensitivity and the preamplifier 17Y also changes its gain. This will result in outputs from the three color channels at $2f$ frequency which are not the same as from the reference channel. The variable gain amplifiers will be automatically actuated until at $2f$ these outputs again are equal. Then the measurement of the color differences between sample and standard at the $1f$ frequency will once again represent the true color differences. As described in connection with FIG. 3, this autocalibration by means of the $2f$ signal occurs at a more rapid rate than the chopping of the light for the $1f$ signal. In other words, calibration relatively thereto will be practically instantaneous.

Let us consider another possible environmental change. Suppose the incandescent lamp in the collimated light source 51 becomes brighter or dimmer, this will have no effect on the accuracy of the measurement because it will raise or lower the levels of the $2f$ signals equally and there will be no change in their ratio.

Now let us suppose that the collimated light source changes its spectral characteristics, let us suppose that it becomes bluer. This may change the level of the $1f$ and the $2f$ output signals from the reference channel and, of course, it will greatly change the relative responses from the color sensing detectors. However, the only effect will be to produce difference voltages at $2f$ between each of the color channels and the reference channel and again these will be rapidly compensated by the change in the variable gain of the amplifiers 17 and the accuracy of match at the $1f$ frequency will remain the same. Of course, if the change in the spectral characteristic of the source were so great that there was no radiation in some of the colors at all, for example if a deep red filter were placed at the source there would be no blue or even green reflected light and so it would not be possible to match the white enamel. However, this is something which will never occur in practice, light sources will change spectrally but not to exclude a particular wavelength. Anything short of this is automatically compensated for.

The compensation for light source changes has great practical advantages. In measuring instruments which are sensitive to light source spectral changes, it is necessary to go to great expense to employ very stable special light sources. The present instrument can use an ordinary incandescent light bulb and no concern need be paid to power line fluctuations. The voltage can vary from less than 100 to more than 130 volts. The instrument will calibrate itself immediately. This represents an important economy in first cost and means that if the light source burns out it is not necessary to have special spare parts. Ordinary incandescent bulbs can be substituted and the accuracy of the comparison is not in any way changed.

It will be noted that the illustrative use described above is a series of refrigerators or other appliances moved past the instrument. There will be breaks between the passing of two refrigerators. These breaks will make a very drastic mark on the recorder which will serve to indicate when a refrigerator is starting to pass the instrument so that a particular refrigerator which is not a good match can be spotted. Also, this permits another practically useful result. While it is desirable for refrigerators to match a standard white panel with reasonable accuracy, it is much more important that the refrigerator shall be uniform across its surface because if a refrigerator is slightly off white it would not look as bad as if it had a streak along its surface. The present invention will not only show the match of the refrigerator as a whole, but also if the color is not uniform throughout the face of the appliance this will show up.

The color comparison need not be of discrete samples, sometimes it is important to monitor a moving strip, for example a moving strip of paper and, of course, the instrument will give just as accurate a record as it does with appliances moving past it. There will, of course, be no sharp breaks as between appliances but the record is continuous and reliable.

It has been brought out above that, if the light source changes in intensity, there will be no change in the accuracy of match. However, if it is desired to obtain a quantitative measurement of departure from a given standard by a difference signal measurement, a problem arises which does not arise when signal ratios are used. This problem is simply solved by a small addition to the circuitry which is shown in FIG. 10. A voltage reference 72, such as a battery, is connected to one end of the difference potentiometer 73 the other end of which is connected to the $2f$ output of the synchronous rectifier 22. This difference voltage which appears in the potentiometer 73 varies the gain of the amplifier 20 thus bringing the output of the reference channel back to the point where its $2f$ signal output is equal to the reference voltage chosen. The only additional elements required are a stable voltage source, an additional amplifier and the amplifier 20 is of the variable gain type.

It should be noted in modifications where the voltage of the $2f$ signal from the reference synchronous rectifier 22 is kept constant this regulation can be used instead of a replacement of different filters 64 and permits the elimination of this filter altogether. Then if there is too great an amount of energy striking the detector 68 the gain of the amplifier 20 is reduced and the response of all channels is fixed regardless of source intensity changes.

When reflectance samples are to be compared against a standard, the color of the sample may not be independent of the angle at which light strikes it. For example there are pigments and other colored bodies which exhibit surface effects similar to the bronzing phenomenon. Also difference in gloss may be important because the effect of light incidence will not always be the same in a diffuse reflector as in a glossy reflector. Of course, both of these characteristics may be present in the same sample. This makes it desirable, particularly for research purposes, to make comparison at more than one angle of light incidence and so for a highly versatile research instrument it is desirable to make the light source movable so that the angle of incidence of its light rays on the sample may be changed. This, of course, is simplicity itself and is indicated on FIG. 7 by the curved arrows. For a production control instrument, if the angle is once fixed the light source can be a permanently fixed one. However, a movable light source around an arc is so simple and cheap that even for production instruments there is some advantage in employing the more versatile instrumentation.

Two other characteristics of the instrument illustrated in FIGS. 7 to 10 bear mention. Since this is an active instrument and so can provide a source of light of considerable intensity and very sensitive visible light responsive detectors are readily available, there will ordinarily be radiant energy to spare. This permits small optics which reduce the cost of the instrument markedly. Thus a very small mirror 60 may be used and, of course, the optics may be dioptric instead of catoptric.

A second consideration is location of the standard 54 and the chopping reticle 55. On many instruments it is desirable to have all of the elements in a single instrument housing or framework which simplifies alignment and component protection. However, it should be noted that it is not in any sense necessary that standard and chopping reticle be physically located in the instrument itself and in certain instruments it may be desirable to locate the chopping reticle and standard at some distance. The instrument still represents a unitary optical arrangement but it need not be a single mechanical enclosure. This adds considerable versatility to the invention and is an additional advantage.

The modifications of the invention which have been described all involve a comparison. In other words, they are comparing the radiation in one channel with radiation in another or a plurality of other channels. It has been pointed out in connection with FIGS. 1 to 6 that when the instrument is used as a passive instrument it is necessary that there be a difference in temperature or other characteristics of the object investigated as compared to its background, and if quantitive or semi-quantitative measurements are required a knowledge of the characteristics of the target becomes necessary, for example temperature in infrared measurements. The same considerations apply in an active instrument if it is desired to measure magnitudes of characteristics of an object rather than a comparison with another object and this is necessary whether the instrument is active or passive.

FIG. 11 illustrates an instrument for detecting and measuring amounts of one or more constituents in a moving fluid, for example a pipe line or a branch thereof in a chemical plant. The instrument provides for an active source 75, for example a source of infrared radiation. Radiation from this source is collimated, and passes through a sample cell 76 into or through which a liquid flows. A reticle 55 of the same design as the corresponding reticle in FIGS. 7 and 8 chops the radiation. It will be noted that the radiation passing through the sample cell is chopped at the 1f frequency whereas radiation which missed it passes through the portion of the reticle which chops at the 2f frequency.

The reticle drive is shown to illustrate a different type of synchronous rectification. Instead of providing synchronous pulses which actuate switches in the synchronous rectifiers shown in FIGS. 3, 6 and 10, the shaft of the reticle carries commutators 77 for the two channels at the two frequencies. This results in synchronous rectification and is a well known alternative method of producing this electrical result. Obviously of course, the equivalent synchronous rectifiers are interchangeable, that is to say, FIG. 11 may be operated with the type shown in FIGS. 3, 6 and 10 and, of course, correspondingly the latter or any of them may employ commutator or any other known types of synchronous rectification.

Radiation, chopped at both 1f and 2f frequencies, then passes through a dispersing prism 78 which separates the radiation into a spectrum in the usual manner. These divergent dispersed rays are imaged by a telescope lens 79 onto a focal surface on which are two detectors. One of these is a reference detector 68 and is stationary. It bears the same reference numeral as in FIGS. 7 to 10. The other detector 80 oscillates across the spectrum as is indicated by the arrow. The reference detector 68 may either be at one particular spectral wavelength at which there is no absorption band of any constituent in the liquid passing into or through the sample cell 76 or alternatively (as shown in dashed lines), it may receive undispersed radiation by reflection from a beam splitting mirror 81 for which the front surface of the prism may be used. Imaging is by a second telescope lens 82.

The electronics are similar to FIG. 10, but only one reference channel, and one other channel, are provided. The oscillating detector 80 successively receives radiation from each wavelength band throughout the spectral region covered. The radiation is chopped both at 1f and 2f. The 2f calibration maintains the detector output as compared to the reference detector the same for the radiation which has not passed through the sample. At any wavelength where there is an absorption band of one or more of the constituents in the liquid to be investigated, the detectors will give different 1f signals. The only requirements for the moving detector is that its oscillation rate be enough greater than the rate of flow of liquid through the sample so that accurate measurement is possible. It is, of course, also necessary that the 2f frequency be much higher than the frequency of scan of the moving detector so that the autocalibration will be practically instantaneous. The operation of the moving detector may be considered as substantially the same as if there were a number of detectors across the spectrum.

The single moving detector permits marked economy, but it requires that the output signal at 1f frequency should be indicated or recorded by means of a readout mechanism which distinguishes between responses at the different positions of the detector and, therefore, at different wavelengths. Such readout mechanisms are conventional, one good one being an ordinary oscilloscope with a horizontal sweep synchronized with the scanning frequency of the detector. The oscilloscope face can then be calibrated with a horizontal wavelength scale, or with certain selected wavelengths indicated where there are absorption bands of constituents of interest. The oscilloscope trace then shows the presence of any constituents having absorption bands by increased response at the horizontal points where the wavelengths of the absorption bands are located. If there are no constituents having absorption bands the oscilloscope trace is a straight line. As in the other modifications, if quantitative measurements are desired, the electronic circuits of the reference channel must include a reference voltage source which may be of the type shown in FIG. 10.

FIG. 11 shows a prism for producing an infrared spectrum. Of course, the prism is of suitable material for the wavelength range used for example, it may be of rock salt. It is not necessary that this type of dispersing means be employed. The same effect can be obtained by the use of diffraction gratings. However, a diffraction grating is best usable only over a narrower wavelength band, usually an octave, as otherwise there may be interference problems from higher order diffraction spectra. The prism is, of course, free from such limitations and may cover a very wide range of wavelengths. On the other hand, if the wavelengths to be used are all located within an octave, diffraction gratings have some advantages and so can be used. If one analyzes the operation of the instruments of the present invention, it becomes apparent that there are provided two or more channels of different spectral response. The use of a prism or grating, producing a continuous spectrum, is only one way of producing channels. Where maximum sharpness in wavelength is desired it presents some advantage as in many cases very sharp cutting filters are difficult to obtain in certain wavelength regions. The essential self-calibration features of the present invention are, however, not concerned with how the differential spectral response of the channels is achieved.

The modifications described in FIGS. 1 to 11 all deal with properties of the object to be investigated which result in a difference in the spectral qualities of the radiations. The autocalibrating features of the present invention are, however, not limited to the investigation of properties of this nature. FIG. 12 illustrates a somewhat different type of instrument which investigates the radiation properties from limited areas, spacially separated. This problem arises when it is desired to map areas by aircraft flying over them. For example, the aircraft may have a number of radiation detectors, which often are infrared detectors, each detector seeing a more or less narrow strip as the plane flies along. Because of the arrangement of strips this type of device is sometimes referred to as a "push broom." The usefulness of the mapping comes into play when there are local differences in radiation from a large background. For example, the plane may fly over open country and it may be desired to indicate where roads or streams are located. These will normally have a different radiation from the surrounding landscape. The same holds true over water. For example, a shifting channel in a harbor may be characterized by different water temperature over the shallows than that over the deep channel. Ocean currents such as the Gulf Stream or local cold currents from icebergs present another instance. A coast line also shows local areas of different radiation. In this case, as in the edge of a large ocean current the effect is primarily that of a line or edge of radiation discontinuity.

One of the problems in mapping is false indications because some of the detectors may have suffered environmental change. For example, a cold draft on one side of the instrument, differential warming or other instrumental drift factors. These would give false signals and the autocalibration which is made possible by the present invention serves to maintain the sensitivity of all of the detectors and associated circuits uniform.

In FIG. 12 there is a large collecting mirror 83 which looks out through a suitable window in the aircraft, shown in the drawing simply as an opening. In the curved focal plane of the mirror there are located a series of detectors 84. Each of these detectors sees a narrow strip of terrain as the aircraft flies along. The detectors are, of course, arranged along a curved line at right angles to the aircraft's flight. The detectors each provide a signal which is amplified and processed in electronic circuits. As these circuits do not differ from those in FIG. 10 they are not repeated in the drawings.

A chopper 55 of the same design as that of FIG. 8 chops the radiation coming through the window by means of the large sectors as shown in FIG. 8. In other words, the chopping is at the 1f frequency. A reference source 85 is provided, the radiation from which passes through the central sectors 58 and 59 of the chopper and is, therefore, chopped at the 2f frequency.

All of the detectors receive radiation chopped at the 2f frequency and the circuits produce 2f signals exactly as described in connection with the instrument in FIG. 10. The balancing of all of the detectors takes place and it is, of course, immaterial which detector is chosen as the reference detector since the object is to assure the same response from all the detectors at the 2f frequency. The radiation chopped at 1f will, therefore, give true 1f signals wherever there is a difference in the radiation from one strip to another and similarly as the aircraft flies the response of the detector seeing each strip will vary with radiation changes.

In the usual operation of a "push broom" mapping device the only concern is with relative radiation changes. In such a case the voltage reference 72 of the circuits in FIG. 10 may be omitted together with the potentiometer 73 and amplifier 74. If, however, it is desired to obtain quantitative measurements as well as relative measurements then the voltage reference can be included and the voltage calibration of the reference channel is effected in the same manner as described in FIG. 10.

The recorder for a "push broom" mapping device normally produces a series of lines, one for each detector, on a moving surface such as a strip of paper. Different intensities produce darker or lighter portions of the line and the final record, therefore, presents a raster type of record from which the radiation variations can be read. These recorders are conventional and so are not shown.

We claim:
1. An autocalibrating comparison radiometer for measuring changes in objects, which changes affect the nature of optical radiations from said objects, comprising, in combination and in optical alignment, means for collecting at least one radiation beam from said object, spectrally selective elements in said beam having responses in a narrow wavelength band including a wavelength in which changes of the object characteristics produce marked radiation changes, at least one reference radiation source, means for producing a beam of radiation therefrom, radiation detecting means producing electric signals, and including electronic amplifying and processing circuits therefor, said detecting means receiving radiation from said beams, means for interrupting the radiation in the beams at a predetermined frequency, means for interrupting beams from said reference source at a frequency which is an even multiple of the first frequency, means for separating the two frequencies in the electronic and amplifying circuits to produce output signals at the two frequencies, differential means for producing an output signal proportional to the difference of the signals at the second frequency and means actuated by said difference signal for changing the outputs of the detecting means until the difference signal at the second frequency is zero, whereby radiation affecting changes in the environment of the system are automatically cancelled.

2. A system according to claim 1 in which each beam from the object has its own detector.

3. A system according to claim 1 comprising a calibrating voltage, a difference circuit in the output from the reference beam detecting means at the second frequency receiving an input from said detecting means output circuit and from the calibrating voltage and means for varying the response of the amplifying circuits at the second frequency actuated by said difference signal in a direction to cancel it whereby the reference beam signal output at the second frequency is maintained constant.

4. A system according to claim 3 in which a plurality of spectrally selective channels are provided and there are difference circuits for the second frequency signals between each channel detector and the reference channel detector.

5. A system according to claim 4 in which the plurality of spectrally selective channels consist of a dispersing element in the beam producing a spectrum, and means for imaging said spectrum onto at least one radiation detector.

6. A system according to claim 5 in which the radiation detector is a single detector and scanning means are provided for moving periodically said detector through at least a portion of the spectrum produced.

7. A system according to claim 5 in which the dispersing element is a prism.

8. An autocalibrating comparison radiometer for measuring changes in a plurality of spacially separated areas of an object, which changes affect the nature of optical radiations from said areas, comprising, in combination and in optical alignment, a plurality of radiation detecting means producing electric signals and including electronic amplifying and processing circuits therefor, said detecting means having fields of view substantially coincident with each of said areas respectively, at least one reference radiation source, said radiation source being in the field of view of all of said radiation detecting means, means for interrupting radiation from the areas of the object to the detecting means at a predetermined frequency, means for interrupting radiation from said reference source to the detecting means at a frequency that is an even multiple of the first frequency, means for separating the two frequencies in the electronic, amplifying, and processing circuits to produce output signals at the two frequencies, differential means for producing an output signal proportional to the difference of signals at the second frequency between one of the detecting means and each of the others, and means actuated by said difference signals for changing the outputs of the detecting means until the signals at the second frequency are zero whereby radiation affecting changes in the environment of the system are automatically cancelled.

9. A radiometer according to claim 8 of the push broom type for aerial mapping, said radiometer being adapted for mounting in an aircraft in predetermined orientation to the flight direction thereof, the radiation detecting means being arranged in a row at right angles to aircraft travel and each detecting means having a field of view of a separate strip of the object to be mapped.

10. A radiometer according to claim 9 in which radiation from the object strikes a converging mirror and the detecting means are mounted in the focal plane surface of said mirror and oriented to receive radiation therefrom.

References Cited in the file of this patent

UNITED STATES PATENTS

| | | |
|---|---|---|
| 2,710,559 | Heitmuller | June 14, 1955 |
| 2,761,350 | Hornig | Sept. 4, 1956 |
| 2,951,939 | Luft | Sept. 6, 1960 |
| 2,963,910 | Astheimer | Dec. 13, 1960 |